(12) United States Patent  
Arslan et al.

(10) Patent No.: US 8,882,883 B2  
(45) Date of Patent: Nov. 11, 2014

(54) APPARATUS AND METHODS TO MONITOR AND CONTROL CYCLIC PROCESS UNITS IN A STEADY PLANT ENVIRONMENT

(71) Applicant: Air Products and Chemicals, Inc., Allentown, PA (US)

(72) Inventors: Erdem Arslan, Macungie, PA (US); Debashis Neogi, Emmaus, PA (US); Xianming Jimmy Li, Orefield, PA (US); Pratik Misra, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 103 days.

(21) Appl. No.: 13/737,323

(22) Filed: Jan. 9, 2013

(65) Prior Publication Data  
US 2014/0174288 A1 Jun. 26, 2014

(30) Foreign Application Priority Data  
Dec. 24, 2012 (EP) .................................. 12199361

(51) Int. Cl.  
G05B 23/02 (2006.01)  
B01D 53/047 (2006.01)  
B01D 53/02 (2006.01)

(52) U.S. Cl.  
CPC ..................................... B01D 53/02 (2013.01)  
USPC .............. 95/1; 95/19; 95/96; 96/114; 96/115; 96/117; 702/77; 702/138; 702/183

(58) Field of Classification Search  
USPC .............. 95/1, 19, 96; 96/109, 113, 114, 115, 96/117, 121; 73/29.03; 702/75–77, 19, 702/138, 183  
See application file for complete search history.

(56) References Cited

U.S. PATENT DOCUMENTS

| | | | |
|---|---|---|---|
| 5,531,807 A * | 7/1996 | McCombs ........................ | 95/26 |
| 7,010,459 B2 | 3/2006 | Eryurek et al. | |
| 7,587,299 B2 | 9/2009 | Miyasaka et al. | |
| 7,634,382 B2 | 12/2009 | Andenna et al. | |
| 7,674,319 B2 | 3/2010 | Lomax, Jr. et al. | |
| 7,789,939 B2 | 9/2010 | Blouin | |
| 8,016,914 B2 | 9/2011 | Belanger et al. | |
| 2013/0061747 A1* | 3/2013 | Turnbull et al. ..................... | 95/8 |

FOREIGN PATENT DOCUMENTS

| | | |
|---|---|---|
| EP | 1338873 A1 | 8/2003 |
| WO | 2006086894 A1 | 8/2006 |

OTHER PUBLICATIONS

N.F. Thornhill, "Spectral principal component analysis of dynamic process data," Control Engineering Practice, vol. 10, No. 8, Aug. 1, 2002, pp. 833-846.  
Thornhill, Nina F., Finding the Source of Nonlinearity in a Process with Plant-Wide Oscillation, IEEE Transactions on Control Systems Technology, vol. 13, No. 3, May 2005, pp. 434-443.

* cited by examiner

Primary Examiner — Frank Lawrence, Jr.  
(74) Attorney, Agent, or Firm — Bryan C. Hoke, Jr.

(57) ABSTRACT

Apparatus and methods are disclosed that allow for the monitoring and analysis of production process data for a multi-step asynchronous cyclic production process (e.g. pressure swing adsorption) in a steady state plant (such as a steam methane reforming plant). Data collected from cooperating sensors is processed applying a moving window discrete Fourier transform (DFT). The transformed data can be further analyzed in the broader steady-state plant environment to accurately detect any process anomalies and avoid false alarms.

17 Claims, 13 Drawing Sheets

APPARATUS AND METHODS TO MONITOR AND CONTROL CYCLIC PROCESS UNITS IN A STEADY PLANT ENVIRONMENT

CROSS-REFERENCE TO RELATED APPLICATIONS

This application claims priority to European Patent Application EP12199361.2, filed Dec. 24, 2012, incorporated herein by reference.

FIELD OF INVENTION

System and methods for monitoring and analyzing data from the performance of asynchronous cyclic multi-line production units (e.g., pressure swing adsorption (PSA), hydrogen production plants) that allow for the diagnosis of operational, environmental, and equipment failure anomalies to prevent full production line failure.

BACKGROUND

Detecting early signs of problems in a complex plant operation is tantamount to preventing an interruption in the manufacturing/production processes. It is desirable for a production plant to maintain a steady state operational trend (e.g., hydrogen production facility). Practically, however, day to day changes in the production plant will affect plant operations and often will stress plant operations (e.g., increase production yield to meet customer demand, raw material feed composition variations, and even weather conditions can affect the plant operation). Another contributory factor that renders steady state production a challenge and renders fault detection more difficult is the inherent nature of a cyclic but asynchronous production system (e.g., PSA production systems).

A number of methods and systems are described in the prior art to address potential problems in production plants by adjusting process variables based on changes in measured process parameters. For example, U.S. Pat. No. 8,016,914, Belanger et al., U.S. Pat. No. 7,674,319, Lomax et al., and U.S. Pat. No. 7,789,939, Boulin, teach various methods for measuring an impurity and adjusting a process variable, such as feed time, to control that impurity in a bed of a PSA system. Such single bed PSA control is widely used and has become an industry practice.

Other production plant fault detection methods have been discovered and implemented. For example, as is described in the article, entitled, "Finding the Source of Nonlinearity in a Process With Plant-Wide Oscillation", Nina F. Thornhill, 2005, Thornhill proposes a non-linearity index that can be used to detect a root cause of oscillation for a dynamic system having a plurality of interacting control loops. This method can be used to detect oscillations caused by self-sustained limit cycles in a control loop. Such oscillations often originate in one loop but propagate to the other loops. With this current practice, the developed non-linearity metric produces high values for the source control loop and lower values for the secondary oscillations that allow a root cause analysis to be performed. The method is based on comparison of surrogate data and real plant data. With this current practice, surrogate data is obtained by applying a discrete Fourier transform (DFT) to real data and then randomizing the arguments of DFT and keeping the amplitude constant. Subsequent in the method, an inverse DFT is applied to produce the surrogate data. The real data with phase coupling produces more structured and more predictable trends than surrogate data. Accordingly, with this existing practice, the non-linearity index exploits the difference in data meaning using time series analysis. Thornhill discloses a method that is practically used for detecting plant-wide oscillation due to interacting control loops and helps to tune controllers for the optimum plant performance.

Existing practices fall short, however, in identifying which step of a cyclical asynchronous production process is the root cause of a generally observed production fault or problem. Although current practices described in prior art utilize a DFT to generate surrogate data for use in identifying process failures, they fail to address various key issues such as the processing of steady state production plant variables. Specifically, with production cycle fluctuations, the variables can either have a basis from "self sustained oscillation" due to a primary/secondary effect of a control loop or coming from noise. It would be advantageous to have a detection system and method that handles cyclic steady state data where oscillation is the normal operation. Such systems and methods could operate to compare oscillation characteristics across various portions of production lines in a production plant (e.g., various production "beds" of a PSA plant) where production line portions among similar production lines would operate to have a similar oscillation with different phase (e.g., multi-bed PSA production plant having asynchronous production steps among a plurality of production lines). Furthermore, it would be advantageous to have a monitoring system and method applied continuously and automatically across a production process throughout the entirety of a steady state production plant.

By way of example, an advantageous system and method could operate in the context of a PSA plant with measuring bed-to-bed variation, and relating those variations to processes inside and outside of the PSA process itself, such as feed composition change, plant production step abnormalities, and/or operational deficiencies such as broken equipment (e.g., a broken valve in the PSA system itself). The desired method could provide steps to detect any deviation in an out-of-phase cyclic system (e.g., PSA) with a number of subunits (e.g., beds). The goal is to ensure that each unit behaves identically to all others when transposed to the same phase. The out-of-phase cyclic system (e.g., PSA) itself, in turn, is affected operationally by other processes in the plant and the desirous systems and methods would account for such environmental and operational variables.

Therefore, there is a need for systems and methods to monitor and analyze data surrounding the execution of a normally cyclic but asynchronous system together with a normally steady state production process.

SUMMARY

The disclosed embodiments satisfy the need in the art by providing a monitoring and analysis apparatus and method that allow for monitoring of a multi-step asynchronous cyclic production process having multiple production units in a steady plant environment. In an illustrative implementation, a monitoring and analysis module cooperates with a sensor array that is electronically coupled to one or more production unit components and/or equipment to collect operational, environmental, and failure data. In the illustrative implementation, the monitoring and analysis module can also be connected to a control system that cooperates with various automation controls that control various production unit components and/or equipment.

In an illustrative operation, the monitoring and analysis module operates to collect data from the sensor array. Such monitoring data can comprise environmental condition data, operational data, and production unit component/equipment data. In the illustrative operation, the collected data is collected in a time domain. A discrete Fourier transform is applied to the time domain collected data to generate frequency domain monitoring data. The transformed data is then analyzed according a failure detection data protocol. In the illustrative implementation, the failure detection protocol comprises a number of steps including defining upper and lower data ranges (e.g., both in the time and frequency domains) for normal/optimized operation of one or more of the production unit components/equipment. Illustratively, the upper and lower normal/optimized data ranges are defined through physical observation of one or more production unit components/equipment as they perform under normal/optimal conditions and to generate predetermined production yield.

In the illustrative operation, transformed data from at least two production unit components are compared against each other according to a selected scale (e.g., log of the ratio of amplitude values, exponent ratios, absolute value ratios, etc.) and analyzed to generate fault determination data. In the illustrative operation, such comparisons are performed according to a selected time interval. If the fault determination data falls outside of the defined protocol normal/optimized data ranges, a flag is set for that specific production unit component/equipment for the observed time interval. Subsequent comparisons are performed over other selected time intervals. If the fault determination data continues to stay out of the normal/optimized protocol range, a failure state is associated for the specific production unit component/equipment and can be communicated to a cooperating control system for subsequent action, including suspending the production line that maintains the faulty production unit component/equipment. Illustratively, the failure state determination can be performed using one or more algorithms that when applied to data identify statistically significant events.

There are several aspect of the apparatus and method as outlined below.

Aspect 1—A monitoring and analysis apparatus for use in a production plant, the apparatus comprising a computing processor operable to:
  receive operational data from one or more sensors operative to sense and communicate data representative of the operation of at least two production unit components utilized in the production process over a selected time interval;
  process the received operational data to transform the received operational data from a time domain to generated frequency domain data having harmonics;
  process the frequency domain data to calculate a value of an amplitude of each of at least one peak of the harmonics of the frequency domain data;
  identify the value of the amplitude of the peak of a significant harmonic of the frequency domain data for each of the at least two production unit components;
  apply a data normalization mathematical function to the identified amplitude values to calculate abnormalities in the identified amplitude values among two selected production unit components of the at least two production unit components as compared to data representative of normal operation amplitude values to generate processed production unit component monitoring data for the two selected production unit components; and
  store the generated processed production unit component monitoring data.

Aspect 2—A monitoring and analysis apparatus for use in a production plant, comprising:
  a computing processor; and
  computing memory communicatively coupled with the computing processor, the computing memory having stored therein instructions that, when executed by the computing processor, cause the computing processor to perform operations comprising:
    receiving operational data from one or more sensors operative to sense and communicate data representative of the operation of at least two production unit components utilized in the production process over a selected time interval;
    processing the received operational data to transform the received operational data from a time domain to generated frequency domain data having harmonics;
    processing the frequency domain data to calculate a value of an amplitude of each of at least one peak of the harmonics of the frequency domain data;
    identifying the value of the amplitude of the peak of a significant harmonic of the frequency domain data for each of the at least two production unit components;
    applying a data normalization mathematical function to the identified amplitude values to calculate abnormalities in the identified amplitude values among two selected production unit components of the at least two production unit components as compared to data representative of normal operation amplitude values to generate processed production unit component monitoring data for the two selected production unit components; and
    storing the generated processed production unit component monitoring data.

Aspect 3—The apparatus according to Aspect 1 or 2, wherein the transform utilized to generate the frequency domain data is selected from the group of a discrete Fourier transform (DFT), Laplace transform, and histogram.

Aspect 4—The apparatus according to Aspect 1, 2 or 3, wherein the transform utilized to generate the frequency domain data is a discrete Fourier transform (DFT).

Aspect 5—The apparatus according to any one of Aspects 1 to 4, wherein each of the at least two production unit components comprises a pressure swing adsorption (PSA) bed.

Aspect 6—The apparatus according to any one of Aspects 1 to 5, wherein each of the one or more sensors is a pressure sensor and the data representative of the operation of at least two production unit components comprises pressure data.

Aspect 7—The apparatus according to any one of Aspects 1 to 6, wherein the peak of the significant harmonic has a frequency that is equal to the inverse of a duration of a single step of a production process performed by each of the at least two production unit components.

Aspect 8—The apparatus according to any one of Aspects 1 to 7, wherein the data normalization mathematical function comprises calculating the log of the ratio of the identified amplitude values, the log of the amplitude ratio data representative of the log of the ratio of the identified amplitude values among the two selected production unit components of the at least two production unit components to generate the processed production unit component monitoring data for the two selected production unit components.

Aspect 9—The apparatus according to any one of Aspects 1 to 8, further operable to define operational data limits representative of a desired operation range for the at least two production units and to process the generated processed production unit component monitoring data to determine if the data is within the defined operational data limits.

Aspect 10—The apparatus according to Aspect 9, further operable to generate alarm data representative of instances when the generated processed production unit component monitoring data fall outside the defined operational limits.

Aspect 11—The apparatus according to Aspect 10, further operable to communicate the generated alarm data to a cooperating production unit component control apparatus for use in providing automated control operations to the at least two production unit components.

Aspect 12—The apparatus according to Aspect 10 or 11, further comprising production unit component control apparatus operable to control the operation of one or more production units in response to said alarm data.

Aspect 13—The apparatus according to any one of Aspects 9 to 12, wherein the operational data limits are calculated by processing historical received production unit component data.

Aspect 14—A production plant comprising a plurality of production units, one more sensors operative to sense and communicate data representative of the operation of said production units, and monitoring and analysis apparatus according to any one of Aspects 1 to 13.

Aspect 15—A method for monitoring and analyzing production plant operational data comprising:
receiving operational data from one or more sensors operative to sense and communicate data representative of the operation of at least two production unit components utilized in the production process over a selected time interval;
processing the received operational data to transform the received operational data from a time domain to generated frequency domain data having harmonics;
processing the frequency domain data to calculate a value of an amplitude of each of at least one peak of the harmonics of the frequency domain data;
identifying the value of the amplitude of the peak of a significant harmonic of the frequency domain data for each of the at least two production unit components;
applying a data normalization mathematical function to the identified amplitude values to calculate abnormalities in the identified amplitude values among two selected production unit components of the at least two production unit components as compared to data representative of normal operation amplitude values to generate processed production unit component monitoring data for the two selected production unit components; and
storing the generated processed production unit component monitoring data.

Aspect 16—The method according to Aspect 15, further comprising calculating the log of the ratio of the identified amplitude values, the log of the amplitude ratio data representative of the log of the ratio of the identified amplitude values among the two selected production unit components of the at least two production unit components to generate the processed production unit component monitoring data for the two selected production unit components.

Aspect 17—The method according to Aspect 15 or Aspect 16, further comprising defining operational data limits representative of a desired operation range for the at least two production units and processing the generated processed production unit component monitoring data to determine if the data is within the defined operational data limits.

Aspect 18—The method according to Aspect 17, further comprising generating alarm data representative of instances when the generated processed production unit component monitoring data fall outside the defined operational limits.

Aspect 19—The method according to any of Aspects 17 or 18, further comprising applying a selected statistical algorithm to the generated processed production unit component data to identify statistically significant instances when the generated processed production unit component data is outside of the operational data limits.

Aspect 20—The method according to Aspect 18, further comprising communicating the generated alarm data to a cooperating production unit component control system for use in providing automated control operations to the at least two production unit components.

Aspect 21—The method according to any one of Aspects 17 to 20, wherein the operational data limits are calculated by processing historical received production unit component data.

Aspect 22—The method according to any one of Aspects 15 to 21, further comprising generating processed production unit component monitoring data over at least two selected discrete time periods for the two selected production unit components to generate a moving data window representative of the continuing operations of the two selected production unit components.

Aspect 23—The method according to any one of Aspects 15 to 22, wherein the significant harmonic of the transformed frequency domain data comprises the harmonic that has a frequency and the inverse of the frequency of the last significant harmonic of the transformed frequency domain data is greater than the time required to complete a single step of a production process production cycle.

Aspect 24—The method according to any one of Aspects 15 to 23, wherein the receiving step comprises receiving operational data from one or more sensors operative to sense and communicate data representative of the operation of at least two production unit components utilized in the production process over a selected time interval, the production units each comprising an adsorber bed.

Aspect 25—The method according to any one of Aspects 15 to 24, wherein the receiving step comprises receiving operational data from one or more sensors operative to sense and communicate data representative of the operation of at least two production unit components utilized in the production process over a selected time interval, the production process comprising a pressure swing adsorption (PSA) process.

Aspect 26—The method according to any one of Aspects 15 to 25, wherein the receiving step comprises receiving operational data from one or more sensors operative to sense and communicate pressure for at least two production unit components utilized in the production process over a selected time interval.

DETAILED DESCRIPTION OF THE PREFERRED EMBODIMENTS

Figure 1:
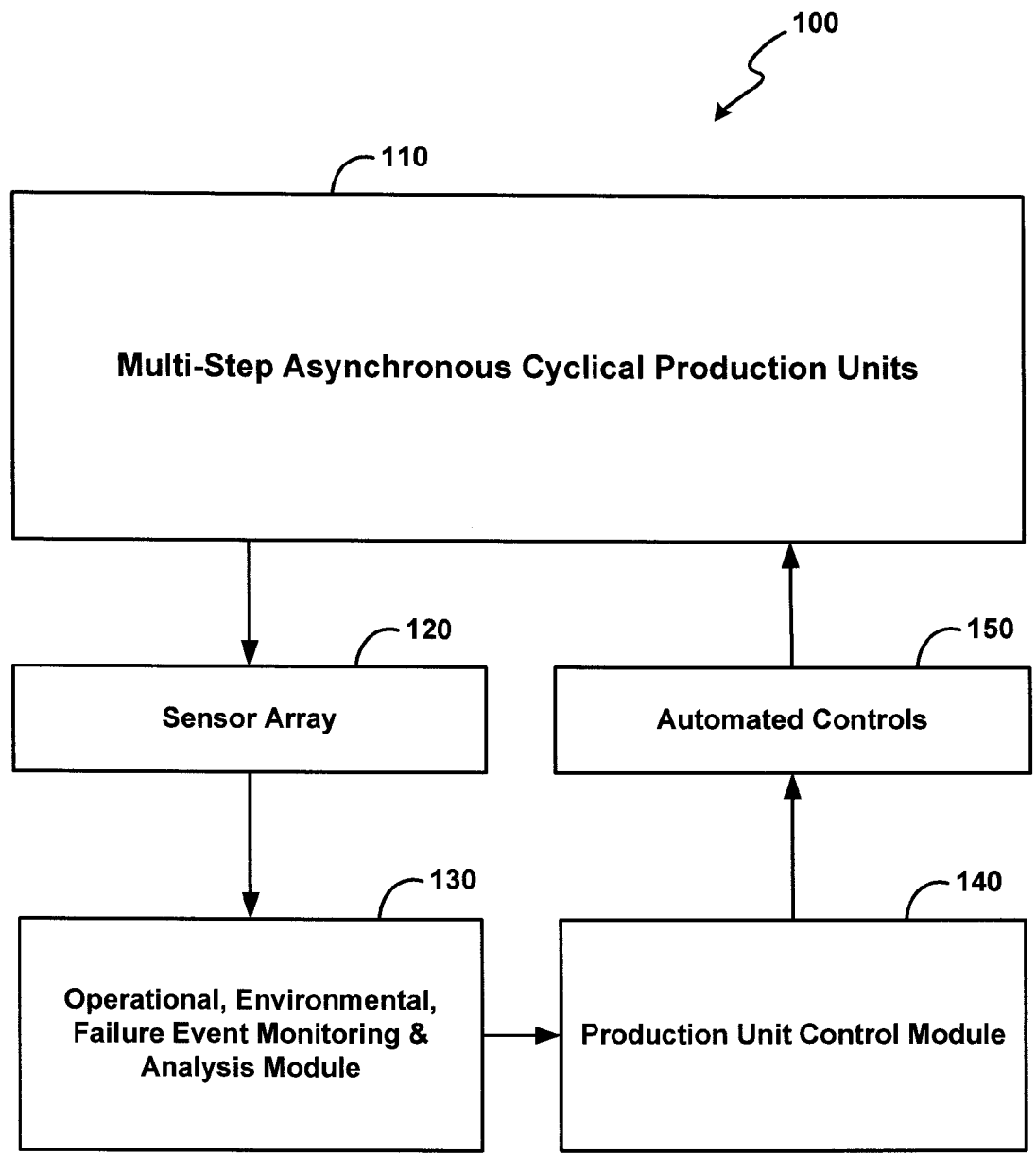
FIG. 1 is a block diagram of a production plant in accordance with the deployment of a system and methods described herein.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

Overview:

The herein described system and methods provide for real-time data monitoring and analysis of a multi-step cyclical asynchronous production plant having multiple production lines. By way of example, the herein described methods will be described in context of monitoring, by illustrative implementation, H2-PSA units in HyCO production plant. This illustrative implementation is merely described for context and one of ordinary skill in the art would appreciate that the herein described system and methods can be applied to monitor and analyze data in connection with various production plants having asynchronous multiple production lines that maintain multi-step cyclic production processes.

In an illustrative implementation, the herein described system and methods can be applied for diagnosis of H2-PSA units in HyCO plants. In the illustrative implementation, the herein described system and methods provide a robust way to simultaneously measure performance of complete PSA units and individual PSA beds, warn production plant operators of any deviation from optimal performance, and allow for plant-wide statistical analysis through the capture of steady-state characteristics of a periodically stable PSA process.

In an illustrative operation, the method can be deployed under varying operating conditions in the HyCO plants, including but not limited to, changing cycle time, production rate, reduced bed mode, etc. Operatively, the method minimizes false alarms but does not compromise sensitivity to capture small operational and/or environmental changes in one or more production units of a production plant (e.g., operational changes/environmental changes in one or more PSA beds of an exemplary HyCO production plant).

In the illustrative operation, there are a number of advantageous results when the herein described system and methods are deployed in steady state production plants. By way of example, the automatic warnings allow early detection of minor problems so that they can be fixed before causing major equipment failures and keep PSA performance at an optimal level. In the long run, this can increase average productivity and reliability of the plant. Additionally, when the herein described system and methods are deployed, the diagnosis time for plant trips may be reduced, allowing the PSA operational data to be integrated into overall statistical plant analysis and providing detailed information about the individual PSA beds.

In an illustrative implementation, the herein described system and methods involve the use of Discrete Fourier Transform (DFT) data collected from one or more sensors monitoring one or more production equipment/components of a multi-step cyclical asynchronous production process (e.g., PSA process). In an illustrative operation, data about the characteristic parameters for each production process component (e.g., PSA bed) or equipment that can represent the component/equipment performance is captured. In the illustrative operation, component/equipment variable data (e.g., PSA bed pressure data) is collected from a cooperating sensor array (or from a cooperating production plant control system—e.g., from a database) for individual production plant components/equipment (e.g., for individual PSA beds) for pre-processing.

The application of DFTs are generally known, and not essential in the herein described system and methods given that other mathematical transformations that convert time domain data into frequency domain data could also be used including, but not limited to, Laplace transform and histogram techniques. The herein described system and methods are operable to identify a set of features from the transformed data that have unique relationships to physical variables. For example, in the context of a PSA production plant (e.g., steam methane reforming process using a PSA as a final product purification step), the third peak of the power spectrum data (i.e., transformed time domain pressure data to frequency domain pressure data) can be correlated to the adsorb time in a PSA. Furthermore, additional transformations may be necessary so that such identified features are invariant under normal process conditions. For example, it is the ratios of the third peak intensities from different units, rather than the intensities themselves, that are invariant to normal process variations. As such, collected and transformed third peak pressure data from two interdependent production units (e.g., PSA beds) can be used to show variants in the production process.

Additionally, it is well known that a process, such as the steam methane reforming process using a PSA as a final product purification step, is typically subject to many changes such as diurnal temperature swings, feedstock variation, sun light intensity change, and customer demand oscillation. These changes will cause variations in the process and possibly ripple through the entire plant. The proposed method of monitoring and analysis can accommodate such expected and normal variations without triggering false alarms, yet it can be sensitive enough to catch true deviations and take early actions to prevent serious interruption to the operation.

United States patents, Belanger et al. (U.S. Pat. No. 8,016, 914), Lomax et al. (U.S. Pat. No. 7,674,319), and Blouin (U.S. Pat. No. 7,789,939) patents are concerned with measuring an impurity and adjusting a process variable, such as feed time, to control that impurity in a bed of a PSA system. Such single bed PSA control is prior art and industry practice. The herein described system and methods, however, are directed to measuring bed-to-bed variation, and relating those variations to processes inside and outside of the production process (e.g., PSA) itself, such as feed composition change, upsets somewhere in the plant, or a broken valve in the production plant (e.g., PSA) system itself. The key distinction is, in the context of a PSA production plant, there is bed-to-bed variation, and the desired plant operation is that all the beds in a multi-bed PSA system behave identically. Thus the method disclosed herein detects any deviation in an out-of-phase cyclic system (in this example, a PSA system) with a number of subunits (in this example adsorption beds). The goal is to ensure that each unit behaves identically to all others when transposed to the same phase. The out-of-phase cyclic system (PSA) itself, in turn, is affected by other processes in the plant.

With reference to FIGS. 1-13, FIG. 1 shows a block diagram of an exemplary multi-step asynchronous cyclical production plant 100. As is shown, production plant 100 comprises multi-step asynchronous cyclical production units 110, sensor array 120, operational/environmental/failure event monitoring and analysis module 130 (hereafter, monitoring and analysis module 130), production unit control module 140, and automated controls 150.

In an illustrative operation, monitoring and analysis module 130 operatively cooperates with sensor array 120 to collect data of one or more conditions/variables of one or more components/equipment found in production units (e.g., pressure at a valve, temperature at a valve, etc.). The collected data is processed and analyzed according to the methods described herein to compare the collected data among various components in the production process and identify any statistically significant operational/environment/event failure conditions that are noteworthy and that might impact the resultant product produced in the plant. Furthermore, the collected and analyzed data can be further processed to provide graphical representations of the operational condition of one or more production unit components/equipment as described in United States published patent application 2008/0109090 A1 entitled, "System and Method for Process Monitoring", which is herein incorporated by reference in its entirety.

In the illustrative operation, illustrative event monitoring and analysis module can operatively cooperate with production unit control module 140 to provide alarm data regarding the out of range operations for one or more production unit components/equipment. In turn, in the illustrative operation, production unit control module 140 can operatively cooperate with automated controls 150 to provide control instructions and control the operation of the one or more production unit components/equipment that are operating out of a pre-determined operational range.

Figure 1A:
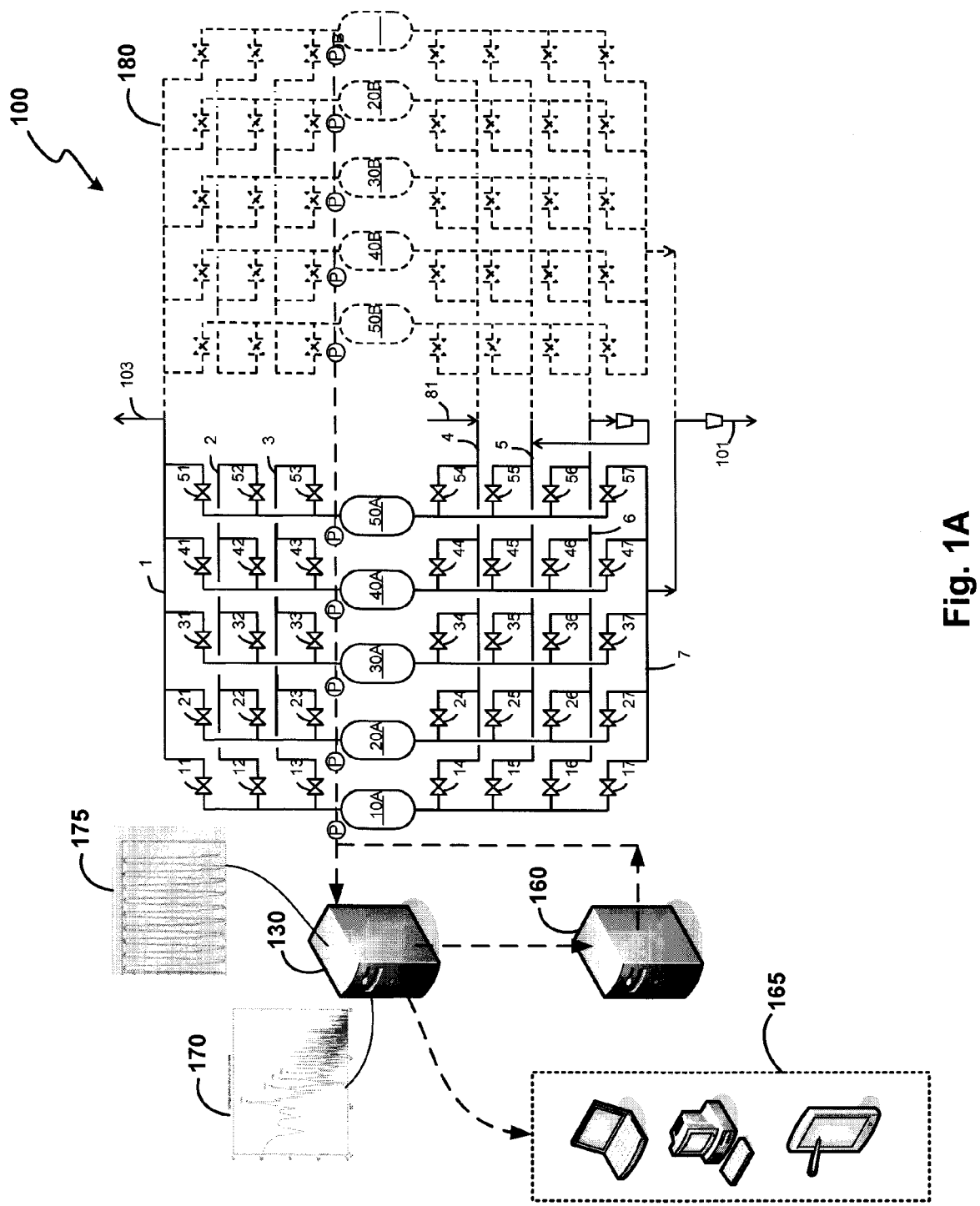
FIG. 1a is a block diagram of an exemplary pressure swing adsorption (PSA) production plant in accordance the system and methods described herein.

FIG. 1A shows and exemplary pressure swing adsorption (PSA) production plant 100. As is shown, production plant 100 comprises monitoring and analysis module 130, control system 160, cooperating computing devices 165 and production units 180. As is further shown, production units can comprise a number of cascading sub-systems. By way of illustrative description, production plant 100 further comprises a number of production unit components/equipment within each of the shown subsystems. The production units can comprise PSA beds 10A, 10B, 20A, 20B, 30A, 30B, 40A, 40B, 50A, 50B and valves 11, 12, 13, 14, 15, 16, 17, 21, 22, 23, 24, 25, 26, 27, 31, 32, 33, 34, 35, 36, 37, 41, 42, 43, 44, 45, 46, 47, 51, 52, 53, 54, 55, 56, and 57. In an illustrative operation, raw material can be introduced through feed 81 into the production unit beds and pressure of the beds can be regulated using the described valves as part of a typical pressure swing adsorption process generally known in the art to separate gases and produce a desired product 103 (e.g., hydrogen) and byproduct 101 (e.g., PSA tail gas, which is typically used as a fuel).

As is shown in FIG. 1A, the valves are operatively connected to monitoring and analysis module 130 through various electronic sensors (e.g., shown as pressure sensors "P" in FIG. 1 A) that are operative to collect data about the operation of the valves and the pressure being experienced by one or more of the production unit beds to which the valves are mechanically and/or electrically connected. In an illustrative operation, pressure data sensed by the electronic sensors (e.g., shown as pressure sensors "P" in FIG. 1 A) is communicated (e.g., over a communications network—not shown) to monitoring and analysis module 130 to allow for monitoring of the operation of the pressure valves as well as the values in one or more of the production unit beds. In an illustrative implementation, a computer program running the monitoring and analysis module processes the collected pressure sensor data as part of environmental, operational, and event failure monitoring protocol as described below. The processed data, illustratively, can comprise transformed time domain data to frequency domain data that allows the monitoring program to normalize the data to allow for easier processing, navigation, and manipulation.

As is shown in FIG. 1A, monitoring and analysis module 130 is operatively connected to control system 160 which can cooperate with the monitoring and analysis module 130 to receive monitoring data representative of an equipment failure or out of range operation of the one or more of the production unit components/equipment. Such data can then be us used to affect the amount raw material introduced through feed 81 to ensure that the desired amount of product 103 is being produced. Additionally, in an illustrative operation, control system 160 can provide control instructions over a communication network (not shown) to the production unit components/equipment to adjust the operation of such product unit components/equipment (e.g., increasing or decreasing pressure) through a control unit (not shown) located on each of the described pressure values that is operative to open and close a desired valve.

Additionally, as is shown in FIG. 1A, monitoring and analysis module 130 is operative to display the monitored and analyzed data through one or more graphical representations 170 and 175 to participating users/operators to allow users and operators to obtain environmental, operational, and event failure conditions of the production plant in an efficient and optimal manner. Such data can be displayed local to the monitoring and analysis module 130 and/or to one or more cooperating computing devices 165 that might have increased mobility features.

It will be appreciated by one skilled in the art that although the production plant described in FIG. 1A is a PSA HyCO production plant, such is merely illustrative, and the inventive concepts described herein can be applied to any production plant having a production line that has multiple steps and has asynchronous cyclic production units.

Figure 2:
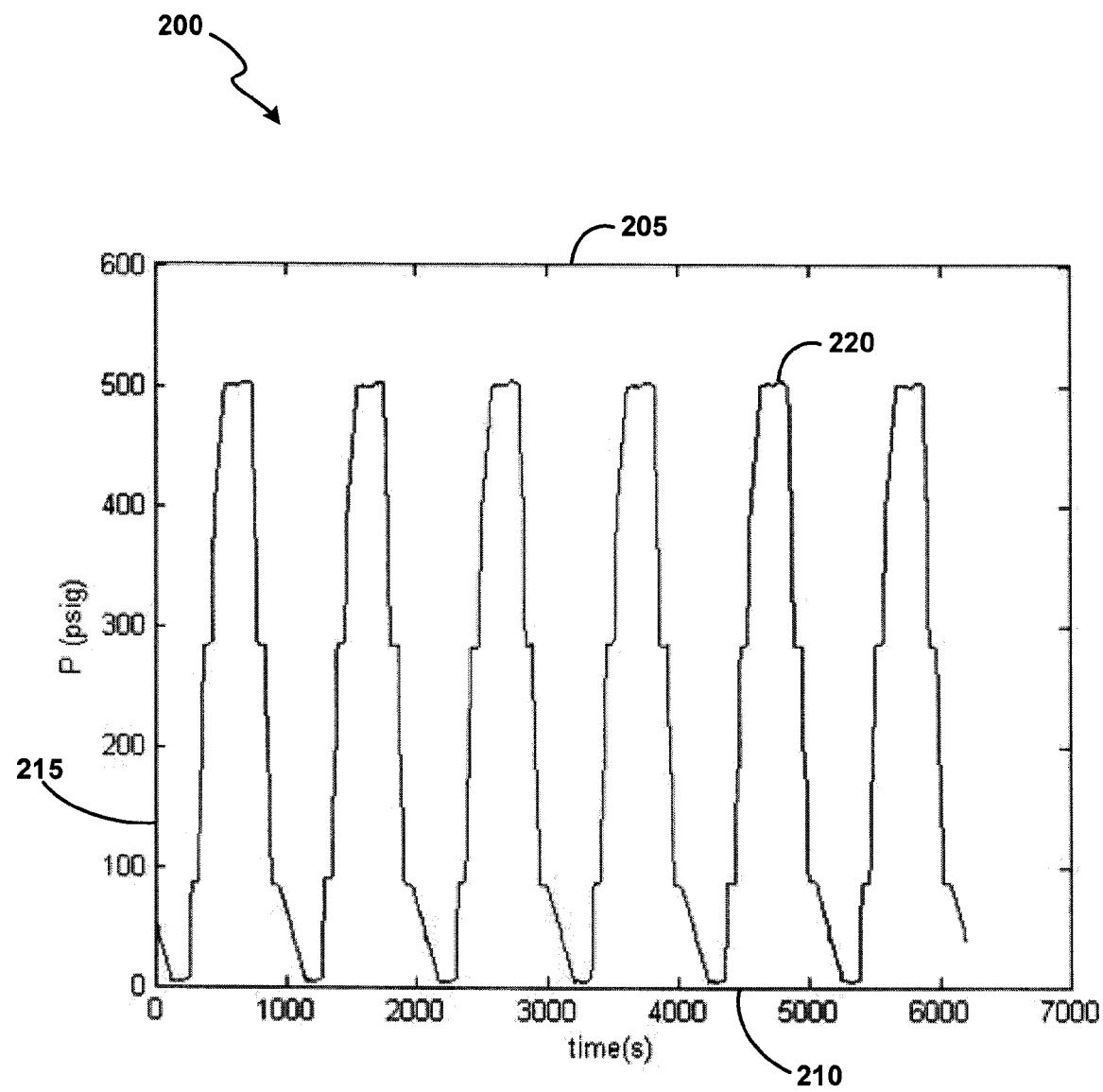
FIG. 2 is a graph showing pressure oscillation in an exemplary PSA bed with a one second measurement interval.

FIGS. 2-9 are various graphs representative of various collected and processed data in accordance with the herein described methods. FIG. 2 shows the collected pressure oscillation data observed at a production plant (e.g., PSA production plant) from a pressure sensor where measurements are taken at a rate of one reading per second. As is shown, in FIG. 2, collected pressure data 200 comprises a time domain-based representation 205 of pressure values 220 that are plotted in selected pressure value units (e.g., Pa or MPa) 215 along a selected time interval 210.

Figure 3:
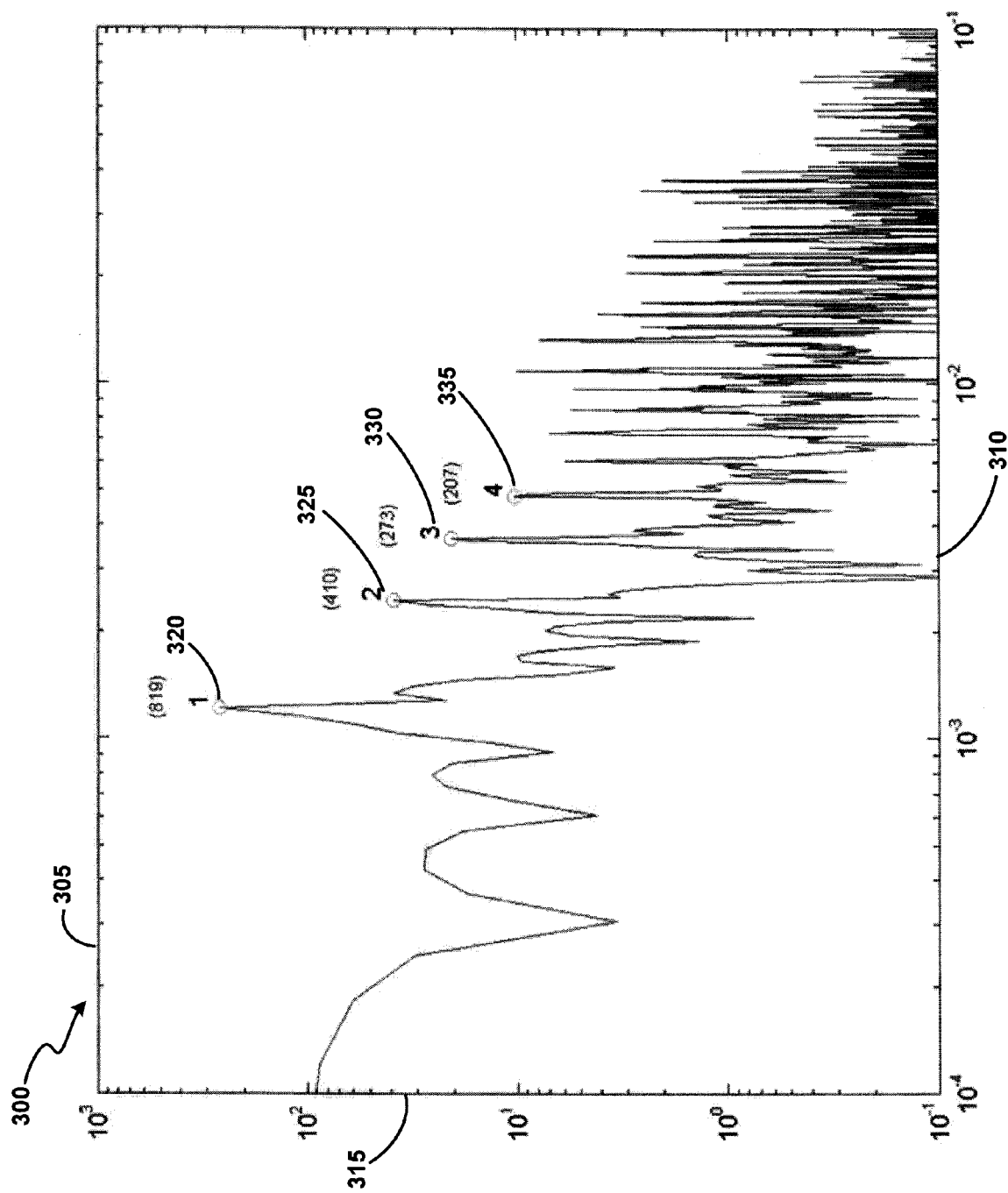
FIG. 3 is a graph showing a discrete Fourier transform (DFT) as applied to selected sampling of production variable data (e.g., pressure data)

FIG. 3 shows a graphical plot of pressure data that has been transformed from the time domain to the frequency domain through the application of a discrete Fourier transform (DFT). As is shown in FIG. 3, graphical plot 300 comprises a frequency domain representation 305 of the transformed pressure data (e.g., four hours of pressure data having a one second interval). Graphical plot 300 shows that transformed data recorded at four substantially significant harmonic amplitudes 320, 325, 330, 335 that are plotted in selected amplitude units 315 along a selected frequency interval 310. In FIG. 3, the transformed harmonic peaks represent the primary, secondary, tertiary, and fourth harmonics of the oscillating pressure data described in FIG. 2. Illustratively, each harmonic represents the duration of one or more steps of a cyclic asynchronous production process that employs a number of cascading production units required to generate product from a specific feed (as is shown in FIG. 1A) (e.g., a PSA production plant). In an illustrative implementation, the fundamental harmonic (e.g., primary harmonic) represents the pressure operation for the entirety of a full production cycle. Each subsequent harmonic represents pressure operations of more discrete steps of the production cycle.

In an illustrative operation, the transformed data can be analyzed to determine which harmonic peak and its frequency of the transformed data represents the shortest step of the production cycle. This determination can be performed by calculating the inverse of the frequency of the identified harmonic peak and comparing with the time duration of the shortest step of the production cycle. In the illustrative operation, this harmonic peak becomes the last harmonic peak of interest since additional observed harmonic peaks describe data (e.g., pressure data of a PSA plant) for less than a full step of the production process.

Figure 4:
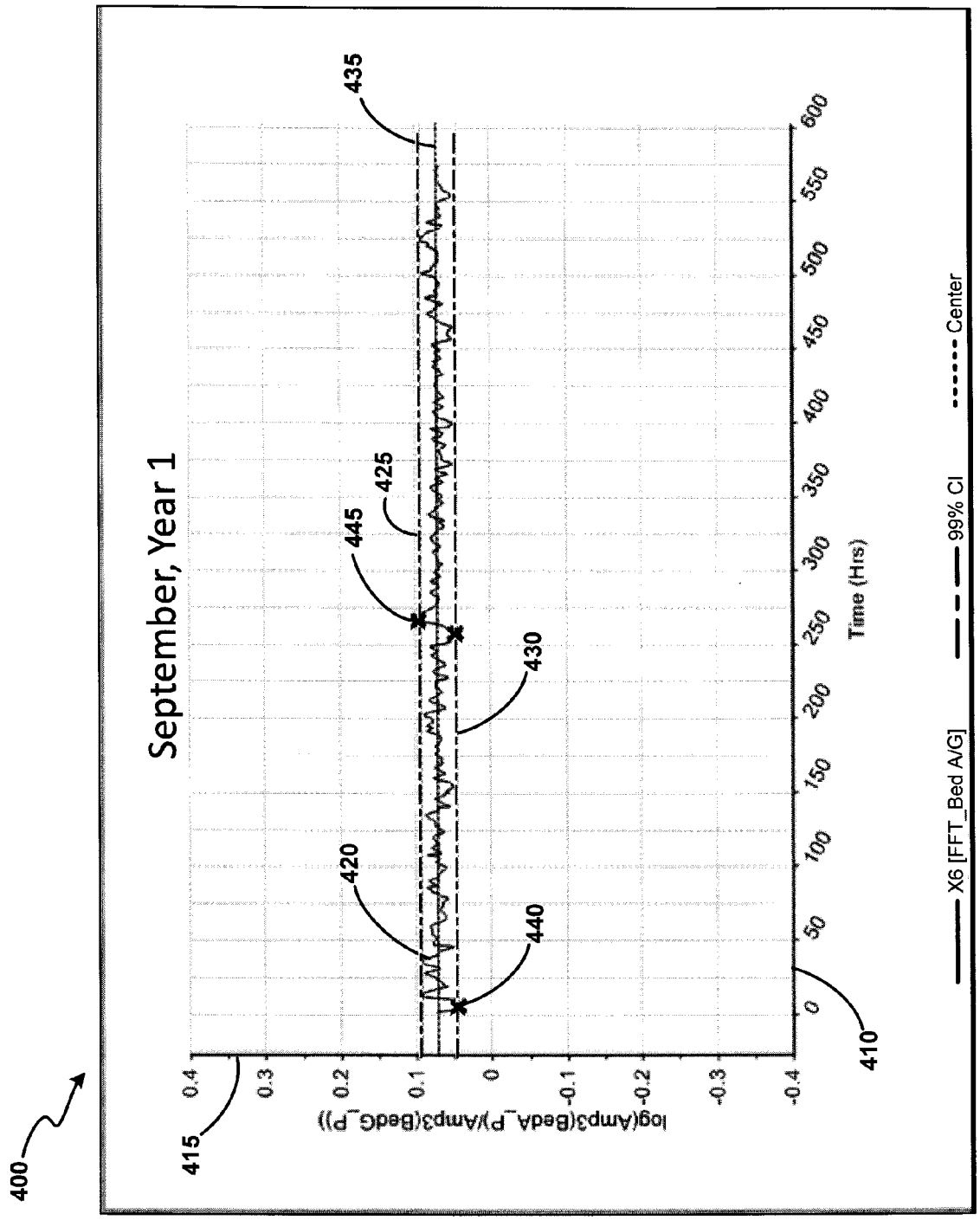
FIG. 4 is a graph showing a log of the ratio of amplitudes of the third peaks of an exemplary PSA bed A and exemplary PSA bed G under normal operation.

FIG. 4 shows graphical plot 400 showing the log of the ratio of amplitudes of the third peaks of transformed production data (e.g., pressure data) of an exemplary PSA bed A and exemplary PSA bed G under normal plant operations. As is shown, plotted data 420 represents the values 415 calculated as the log of the ratio of amplitudes of the last significant harmonic peak (e.g., third peak) of transformed production data, as is described in FIG. 3 for two production units (e.g., two PSA beds), along selected time units 410. Additionally, as is shown in FIG. 4, graphical plot 400 comprises upper limit 425 and lower limit 430. In an illustrative implementation, upper limit 425 and lower limit 430 can be calculated by collecting production plant data for observed normal operation of a production plant over a given period of time such that the production plant generates the desired product yield taking into account fluctuations in operational and/or environmental conditions. In an illustrative implementation, such normal plant operation data can be observed by a plant operator and stored by the monitoring and analysis module 130 of FIG. 1. Further, as is shown, instances 440 and 445 of when plotted data 420 (i.e., the calculated log of the ratio of amplitudes) passes beyond lower limit 430 and upper limit 425, respectively, can be determined to show when the processed production process data falls outside the established range of normal operation. The center line between the upper and lower limits is shown as line 435.

It will be appreciated by one skilled in the art that although the monitoring and analysis method is described utilizing log of the ratio of amplitudes, other normalization transforms could be used to compare the operational characteristics of two cooperating interdependent production units of a production plant in accordance with the inventive concepts described herein.

Figure 5:
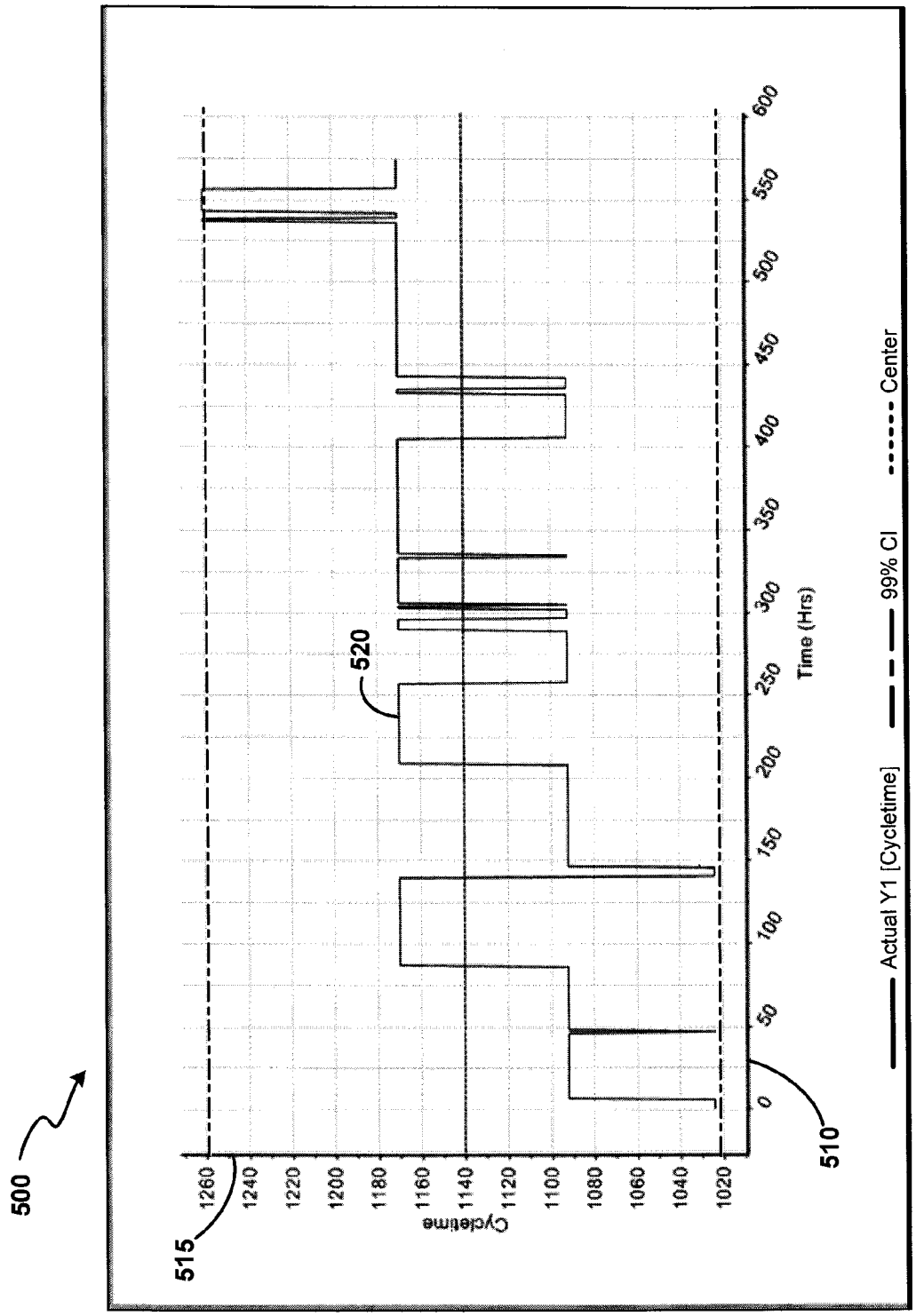
FIG. 5 is a graph showing cycle times of PSA during a selected time period.

FIG. 5 shows graphical plot 500 of production cycle time data 520 for a production process (e.g., cycle time of a PSA) during a selected time period. As is shown, production cycle time data 520 is plotted according to selected cycle time value units 515 over selected time units 510. In an illustrative implementation, the cycle time is of interest to an operator since it can be used to determine if there are abnormal operations within the production plant by comparing cycle times with observed product yields over a given period of time.

Figure 6:
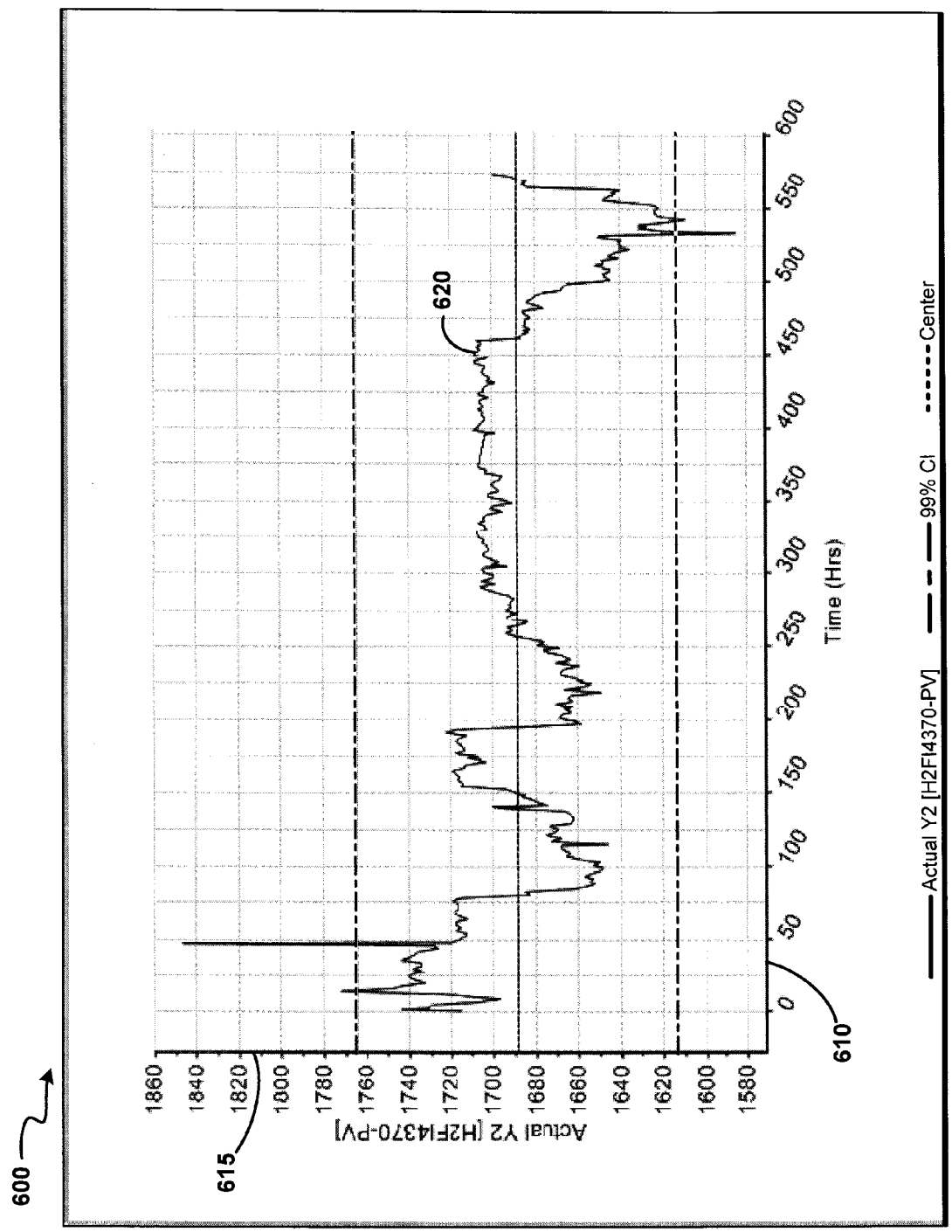
FIG. 6 is a graph showing production rates during a selected time period.

FIG. 6 shows a graphical plot 600 of the production rate data 620 of the production process described in FIG. 5. As is shown, graphical plot 600 comprises production rate data 620 that is plotted according to a selected production rate unit scale 615 along selected time units 610. In an illustrative implementation, the production rate is of interest to an operator since it can be used to determine if there are abnormal operations within the production plant by comparing production rates with observed production cycle times over a given period of time.

Figure 7:
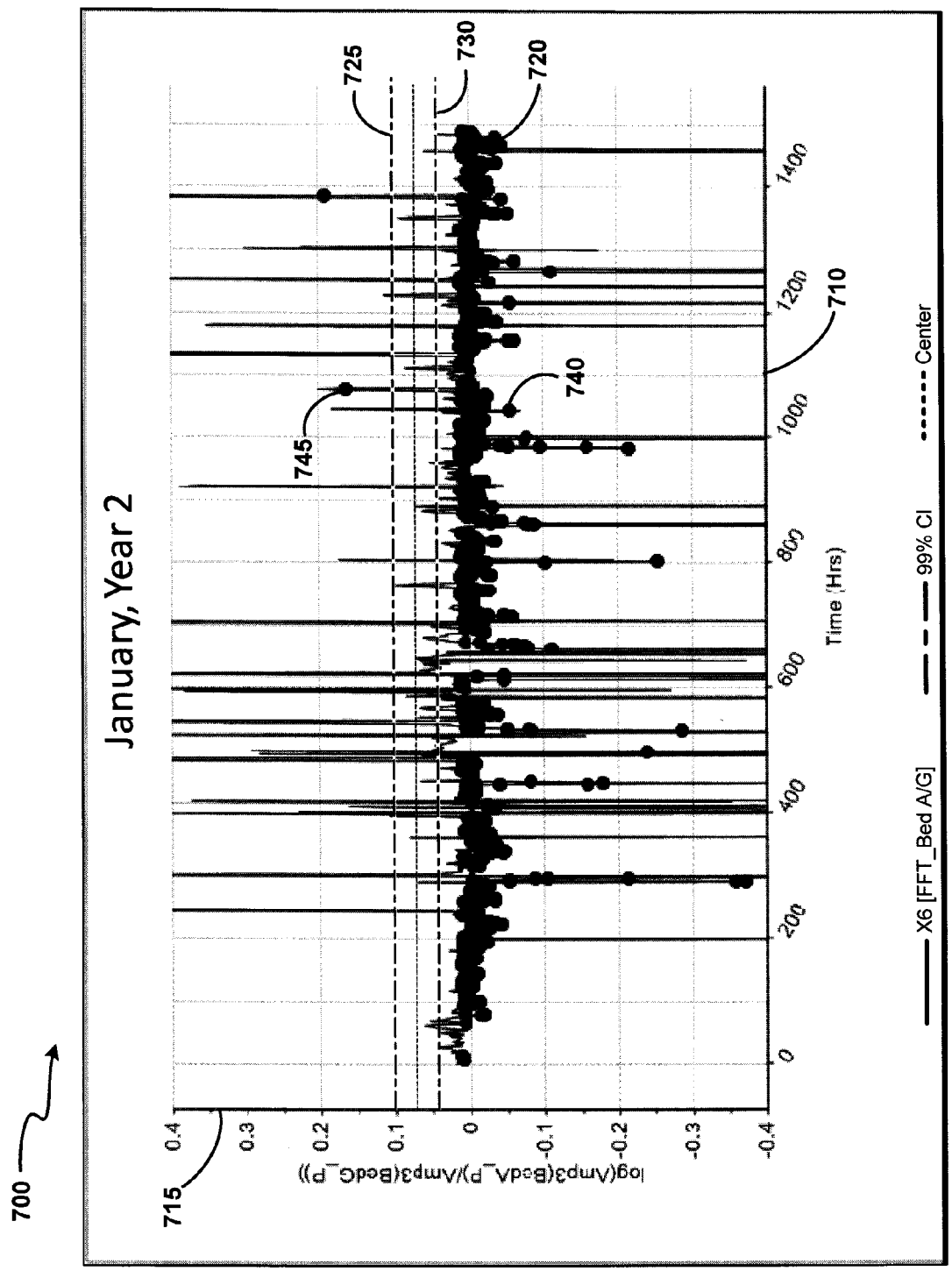
FIG. 7 is a graph showing a log of the ratio of amplitudes of the third peaks of an exemplary PSA bed A and exemplary PSA bed G during a selected time period.

FIG. 7 shows graphical plot 700 showing the log of the ratio of amplitudes of the third peaks of transformed production data (e.g., pressure data of a PSA plant) of the exemplary PSA bed A and exemplary PSA bed G of FIG. 4 at a subsequent point in time (i.e., approximately four months). As is shown, plotted data 720 represents the values 715 calculated as the log of the ratio of amplitudes of the last significant harmonic peak (e.g., third peak) of transformed production data, as is described in FIG. 3 for two production units (e.g., two PSA beds), along selected time units 710. Additionally, as is shown in FIG. 7, graphical plot 700 comprises upper limit 725 and lower limit 730. In an illustrative implementation, upper limit 725 and lower limit 730 can be calculated by collecting production plant data for observed normal operation of a production plant over a given period of time such that the production plant generates the desired product yield taking into account fluctuations in operational and/or environmental conditions. In an illustrative implementation, such normal plant operation data can be observed by a plant operator and stored by the monitoring and analysis module 130 of FIG. 1. Further, as is shown, instances 740 and 745 of when plotted data 720 (i.e., the calculated log of the ratio of amplitudes) passes beyond lower limit 730 and upper limit 725, respectively, can be determined to show when the processed production process data falls outside the established range of normal operation.

As is shown in FIG. 7, the production process operation observed and plotted in graphical plot 700 indicates a substantial number of instances when the production process data falls outside the normal range of operation. In an illustrative operation, in reading graphical plot 700, an operator would be given immediate insight that there are various abnormalities in the operation of one of the observed production units (e.g., PSA bed). Such information can be used to control the production unit to remove the abnormality.

Figure 8:
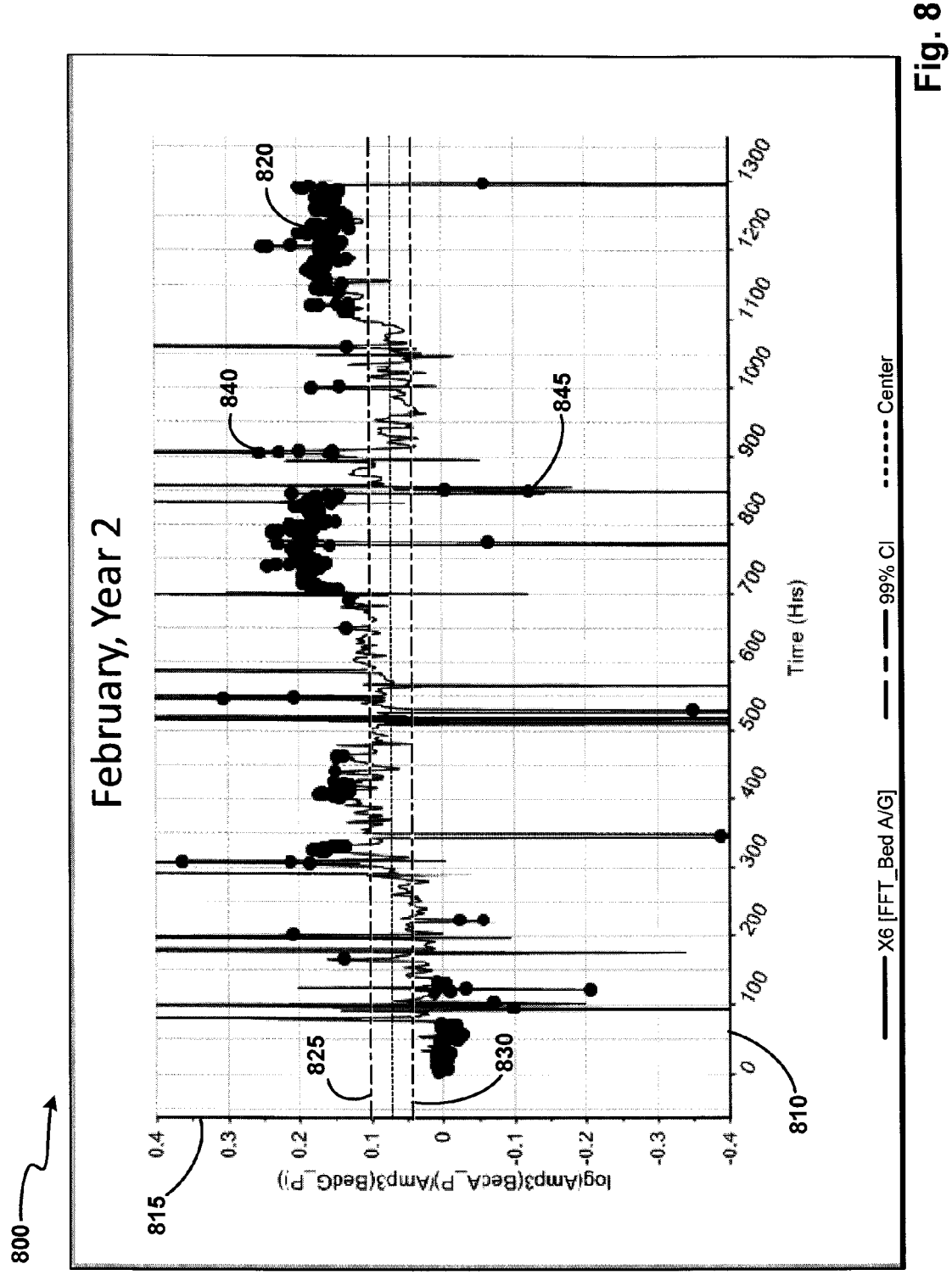
FIG. 8 is a graph showing a log of the ratio of amplitudes of the third peaks of an exemplary PSA bed A and exemplary PSA bed G during a second selected time period.

FIG. 8 shows graphical plot 800 showing the log of the ratio of amplitudes of the third peaks of transformed production data (e.g., pressure data of a PSA plant) of the exemplary PSA bed A and exemplary PSA bed G of FIG. 4 at a point in time subsequent to that of FIG. 7 (i.e., approximately one month). As is shown, plotted data 820 represents the values 815 calculated as the log of the ratio of amplitudes of the last significant harmonic peak (e.g., third peak) of transformed production data, as is described in FIG. 3 for two production units (e.g., two PSA beds), along selected time units 810. Additionally, as is shown in FIG. 8, graphical plot 700 comprises upper limit 825 and lower limit 830. In an illustrative implementation, upper limit 825 and lower limit 830 can be calculated by collecting production plant data for observed normal operation of a production plant over a given period of time such that the production plant generates the desired product yield taking into account fluctuations in operational and/or environmental conditions. In an illustrative implementation, such normal plant operation data can be observed by a plant operator and stored by the monitoring and analysis module 130 of FIG. 1. Further, as is shown, instances 845 and 840 of when plotted data 820 (i.e., the calculated log of the ratio of amplitudes) passes beyond lower limit 830 and upper limit 825, respectively, can be determined to show when the processed production process data falls outside the established range of normal operation.

As is shown in FIG. 8, the production process operation observed and plotted in graphical plot 800 indicates a substantial number of instances when the production process data falls outside the normal range of operation. In an illustrative operation, in reading graphical plot 800, an operator would be given immediate insight that there are various abnormalities in the operation of one of the observed production units (e.g., PSA bed). Such information can be used to control the production unit to remove the abnormality.

Figure 9:
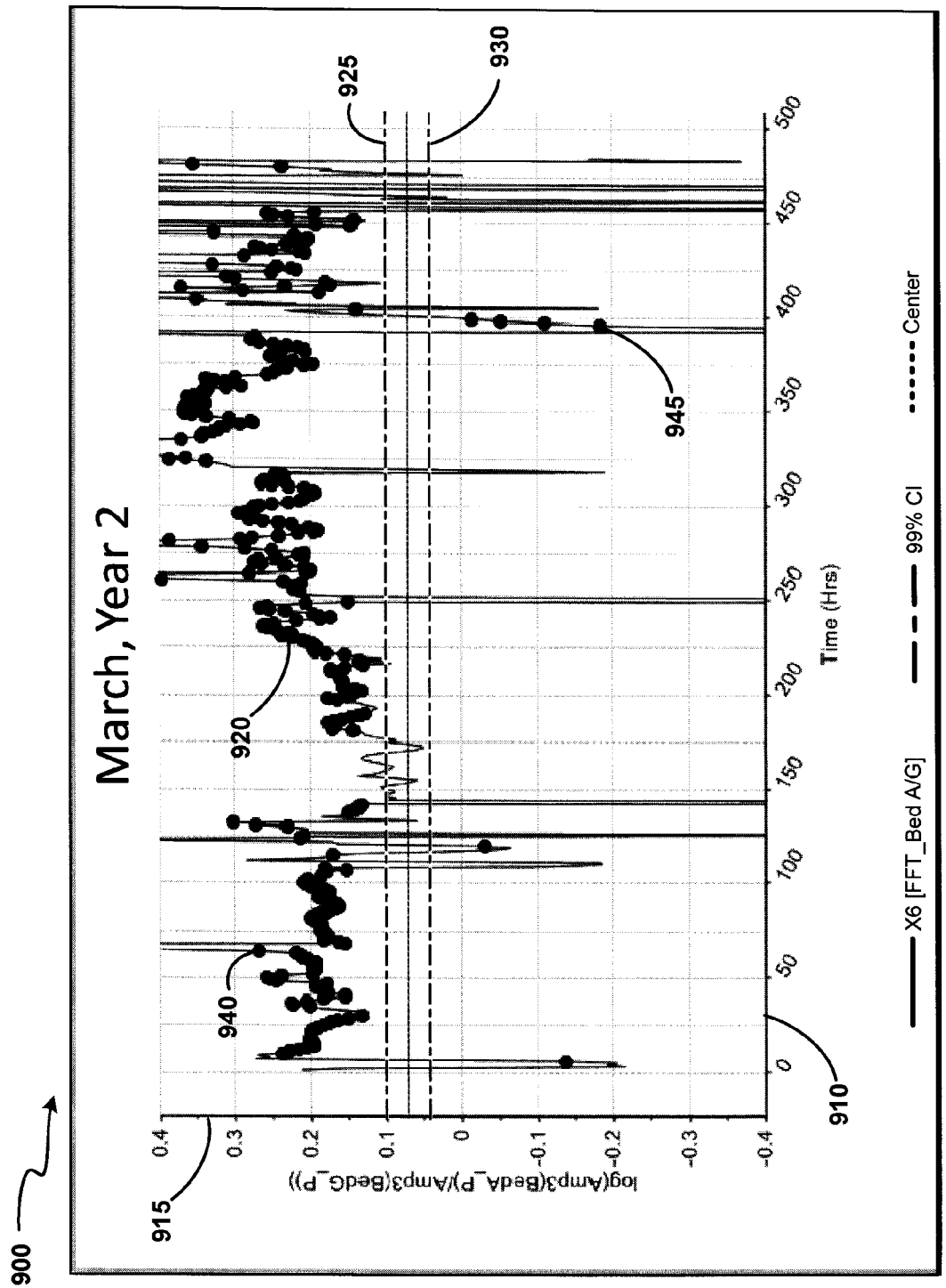
FIG. 9 is a graph showing a log of the ratio of amplitudes of the third peaks of an exemplary PSA bed A and exemplary PSA bed G during a third selected time period.

FIG. 9 shows graphical plot 900 showing the log of the ratio of amplitudes of the third peaks of transformed production data (e.g., pressure data of a PSA plant) of the exemplary PSA bed A and exemplary PSA bed G of FIG. 4 at a point in time subsequent to that of FIG. 8 (i.e., approximately one month). As is shown, plotted data 920 represents the values 915 calculated as the log of the ratio of amplitudes of the last significant harmonic peak (e.g., third peak) of transformed production data, as is described in FIG. 3 for two production units (e.g., two PSA beds), along selected time units 910. Additionally, as is shown in FIG. 9, graphical plot 900 comprises upper limit 925 and lower limit 930. In an illustrative implementation, upper limit 925 and lower limit 930 can be calculated by collecting production plant data for observed normal operation of a production plant over a given period of time such that the production plant generates the desired product yield taking into account fluctuations in operational and/or environmental conditions. In an illustrative implementation, such normal plant operation data can be observed by a plant operator and stored by the monitoring and analysis module 130 of FIG. 1. Further, as is shown, instances 945 and 940 of when plotted data 920 (i.e., the calculated log of the ratio of amplitudes) passes beyond lower limit 930 and upper limit 925, respectively, can be determined to show when the processed production process data falls outside the established range of normal operation.

As is shown in FIG. 9, the production process operation observed and plotted in graphical plot 900 indicates a substantial number of instances when the production process data falls outside the normal range of operation. In an illustrative operation, in reading graphical plot 900, an operator would be given immediate insight that there are various abnormalities in the operation of one of the observed production units (e.g., PSA bed). Such information can be used to control the production unit to remove the abnormality.

In reviewing FIGS. 7, 8, and 9, the graphical plots show the log of the ratio of amplitudes of the third peaks of transformed production data (e.g., pressure data of a PSA plant) of the exemplary PSA bed A and exemplary PSA bed G of FIG. 4 at three distinct time periods spanning approximately three months. It is appreciated that as time progresses, the value of the log of the ratio of amplitudes increases consistently and goes out of control bounds. Armed with this data, operators can work quickly to identify the production units that are working abnormally and correct their operation to avoid cascading failures between and among interdependent production units (e.g., production beds of a PSA plant) and, more importantly, to avoid a full production plant shutdown.

Figure 10:
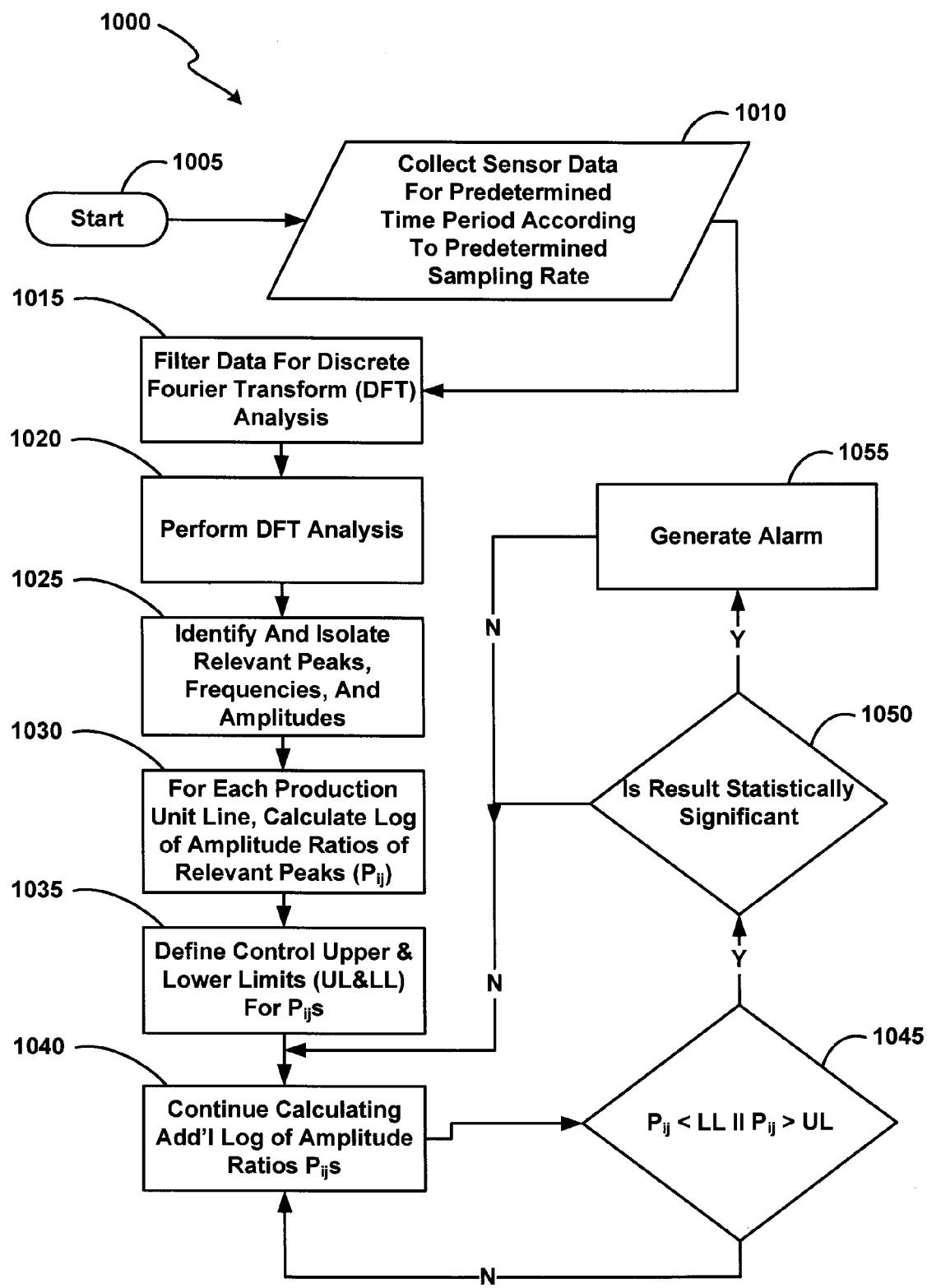
FIG. 10 is a flow chart of an illustrative monitoring method in accordance with the herein described system and methods.

FIG. 10 depicts exemplary monitoring and analysis method 1000. As is shown, processing for monitoring and analysis method 1000 starts at block 1005 and proceeds to block 1010 where sensor data is collected for a predetermined time period according to a predetermined sample rate. In an illustrative implementation, the sensor data is representative of the operation of a production unit component/equipment of a multi-step asynchronous cyclic production line (e.g., valve of a PSA production line having multiple production beds). Processing then proceeds to block 1015 where the collected data is filtered (e.g., using windows functions such as Hann, Hamming, and Tukey windows that illustratively operate to eliminate end-effects in finite sized signals) in preparation of applying a discrete Fourier transform (DFT) that occurs at block 1020. The transformed data is further processed at block 1025 where relevant peaks, frequencies, and amplitudes of the transformed data are identified. In an illustrative implementation, a relevant peak can comprise a peak of which the inverse of its frequency is longer than the shortest step in the multi-step production process. Once the relevant peaks are identified, in an illustrative implementation, a log of the ratio of the amplitudes ("amplitude ratios") of the identified peaks is calculated at block 1030. Acceptable upper and lower limits for the calculated log of the amplitude ratio applied peak data is determined at block 1035.

In an illustrative implementation, the acceptable upper and lower limits can be practically determined by observing normal/optimal operation of one or more production components/equipment. Processing then proceeds to block 1040 where the logs of the amplitude ratios of the data representing monitoring data for other production unit components/equipment are calculated. Processing then proceeds to block 1045 where a comparison is performed for each of the calculated logs of the amplitude ratios to determine if the values are within the upper and lower limits identified at block 1035. If the comparison indicates that the calculated log of the amplitude ratios is outside the defined upper and lower limits, processing proceeds to block 1050 where a check is performed to determine whether the identified log of the amplitude ratio calculated at block 1045 is statistically significant. In an illustrative implementation, one or more commonly practiced statistical algorithms and methodologies can be applied to assist in determining whether the identified exceeding range calculated log of the amplitude ratio is statistically significant in context of operation of individual production unit component/equipment and in the context of the operation of the production plant on the whole (e.g., illustratively, a normal operation window can be defined based on a plant personnel's knowledge of a well-operating process. Mean and standard deviation of the quantity of interest—in this case, log of ratio of amplitudes of third peaks from two PSA beds' pressure signal's DFT—can be calculated in the normal operating window. Limits of good operation can then be defined as mean plus and minus three times the standard deviation. For any new data, if the quantity of interest is outside the limits identified earlier, it can be considered statistically different from normal operation. To prevent false alarms due to sudden fluctuations, the operation can be flagged as operating outside the normal operation limits if the signal stays continuously outside the limits for a preselected time period). If the check at block 1050 indicates that the result of the comparison performed at block 1045 is statistically significant, processing proceeds to block 1055, where an alarm is generated. In an illustrative implementation, the generated alarm can be communicated to a cooperating control system to allow the control system to suspend the operation of one or more production unit components/equipment. Processing then reverts to block 1040 and proceeds from there.

If the check at block 1045 indicates, however, that the comparison of the calculated log of the amplitude ratios are within the identified upper and lower limits, processing reverts to block 1040 and proceeds from there. Similarly, if the check at block 1050 indicates that the result of the comparison performed at block 1045 is not statistically significant, processing reverts to block 1040 and proceeds from there.

Although exemplary monitoring and analysis method 1000 is described as applying log of the amplitude ratio to the identified relative peaks of the transformed data, such processing is merely illustrative and one of ordinary skill in the art could apply other types of mathematical manipulations such as root mean square calculation, average calculation, and other mathematical manipulations that result in data normalization.

Figure 11:
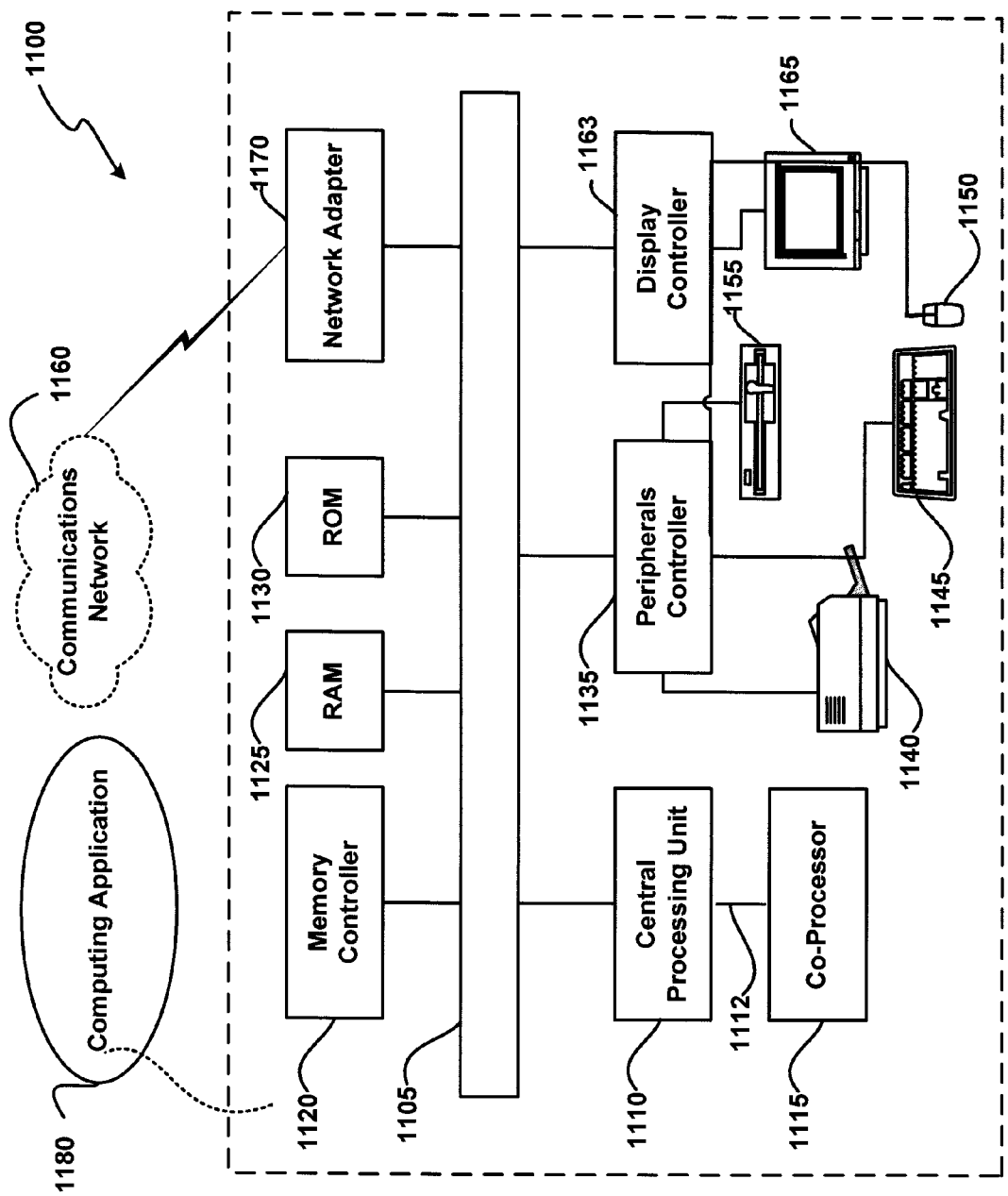
FIG. 11 is a block diagram of an exemplary computing environment in accordance with the herein described system and methods.

FIG. 11 depicts an exemplary computing system 1100 in accordance with herein described system and methods. The computing system 1100 is capable of executing a variety of computing applications 1180. Computing applications 1180 can comprise computing applications, computing applets, computing programs and other instruction sets operative on computing system 1100 to perform at least one function, operation, and/or procedure. Exemplary computing system 1100 is controlled primarily by computer readable instructions, which may be in the form of software. The computer readable instructions can contain instructions for computing system 1100 for storing and accessing the computer readable instructions themselves. Such software may be executed within central processing unit (CPU) 1110 to cause the computing system 1100 to do work. In many known computer servers, workstations and personal computers, CPU 1110 is implemented by micro-electronic chips CPUs called microprocessors. A co-processor 1115 is an optional processor, distinct from CPU 1110 (i.e., the main CPU), that performs additional functions or assists the CPU 1110. The CPU 1110 may be connected to co-processor 1115 through interconnect 1112. One common type of co-processor is the floating-point co-processor, also called a numeric or math co-processor, which is designed to perform numeric calculations faster and better than a general-purpose CPU.

In operation, the CPU 1110 fetches, decodes, and executes instructions, and transfers information to and from other resources via the computer's main data-transfer path, system bus 1105. Such a system bus connects the components in the computing system 1100 and defines the medium for data exchange. Memory devices coupled to the system bus 1105 include random access memory (RAM) 1125 and read only memory (ROM) 1130. Such memories include circuitry that allows information to be stored and retrieved. The ROM 1130 generally contain stored data that cannot be modified. Data stored in the RAM 1125 can be read or changed by CPU 1110 or other hardware devices. Access to the RAM 1125 and/or ROM 1130 may be controlled by memory controller 1120. The memory controller 1120 may provide an address translation function that translates virtual addresses into physical addresses as instructions are executed.

In addition, the computing system 1100 can contain peripherals controller 1135 responsible for communicating instructions from the CPU 1110 to peripherals, such as, printer 1140, keyboard 1145, mouse 1150, and data storage drive 1155. Display 1165, which is controlled by a display controller 1163, is used to display visual output generated by the computing system 1100. Such visual output may include text, graphics, animated graphics, and video. The display controller 1163 includes electronic components required to generate a video signal that is sent to display 1165. Further, the computing system 1100 can contain network adaptor 1170 which may be used to connect the computing system 1100 to an external communications network 1160.

Computing system 1100, described above, can be deployed as part of a computer network. In general, the above description for computing environments applies to both server computers and client computers deployed in a network environment.

Figure 12:
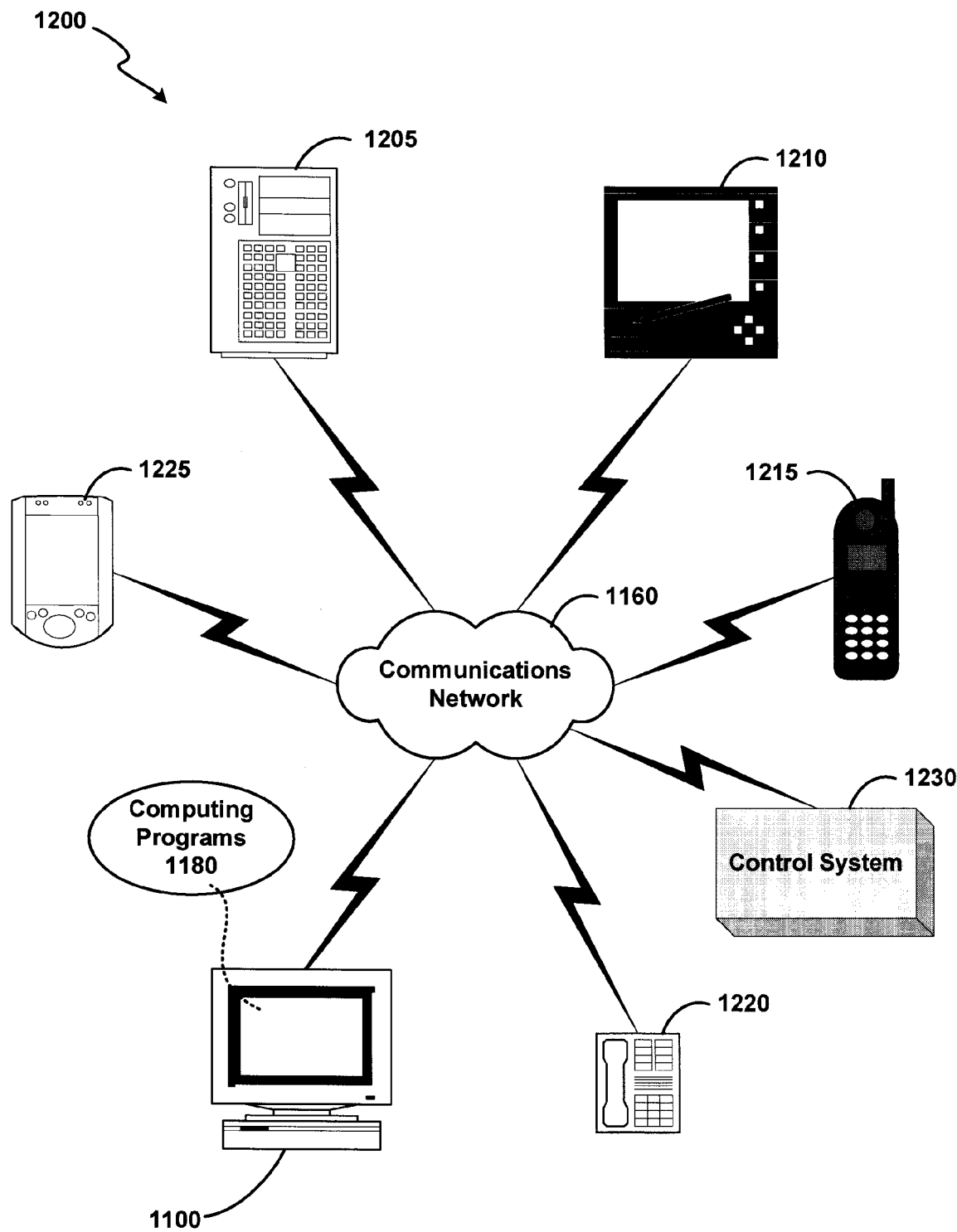
FIG. 12 is a block diagram of an exemplary networked computing environment in accordance with the herein described system and methods.

FIG. 12 illustrates an exemplary illustrative networked computing environment 1200, with a server in communication with client computers via a communications network, in which the herein described apparatus and methods may be employed. As shown in FIG. 12, a server computing environment 1205 may be interconnected via an external communications network 1160 (which may be either of, or a combination of a fixed-wire or wireless LAN, WAN, intranet, extranet, peer-to-peer network, virtual private network, the Internet, or other communications network) with a number of client computing environments such as tablet personal computer 1210, mobile telephone 1215, telephone 1220, computing system 1100, and personal digital assistant 1225. In a network environment in which the external communications network 1160 is the Internet, for example, the server computing environment 1205 can be dedicated computing environment servers operable to process and communicate data to and from computing system 1100, tablet personal computer 1210, mobile telephone 1215, telephone 1220, personal digital assistant 1225, and control system 1230 via any of a number of known protocols, such as, hypertext transfer protocol (HTTP), file transfer protocol (FTP), simple object access protocol (SOAP), wireless application protocol (WAP), or Internet Protocol (IP). Additionally, networked computing environment 1200 can utilize various data security protocols such as secured socket layer (SSL) or pretty good privacy (PGP). Computing system 1100, tablet personal computer 1210, mobile telephone 1215, telephone 1220, personal digital assistant 1225, and control system 1230 can each be equipped with operating system operable to support one or more computing applications, such as a web browser (not shown), or other graphical user interface (not shown), environment data display/navigation application or a mobile desktop environment (not shown) to gain access to the server computing environment 1205.

In operation, a user (not shown) may interact with a computing application running on a client computing environment to obtain desired data and/or computing applications. The data and/or computing applications may be stored on server computing environment 1205 and communicated to cooperating users through computing system 1100, tablet personal computer 1210, mobile telephone 1215, telephone 1220, personal digital assistant 1225, or control system 1230 over exemplary external communications network 1160. A participating user may request access to specific data and applications housed in whole or in part on server computing environment 1205. This data may be communicated between computing system 1100, tablet personal computer 1210, mobile telephone 1215, telephone 1220, personal digital assistant 1225, control system 1230 and server computing environment 1205 for processing and storage. Server computing environment 1205 may host computing applications, processes and applets for the generation, authentication, encryption, and communication data and applications and may cooperate with other server computing environments (not shown), third party service providers (not shown), network attached storage (NAS) and storage area networks (SAN) to realize application/data transactions.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

It is understood that the herein described systems and methods are susceptible to various modifications and alternative constructions. There is no intention to limit the herein described systems and methods to the specific constructions described herein. On the contrary, the herein described systems and methods are intended to cover all modifications, alternative constructions, and equivalents falling within the scope and spirit of the herein described systems and methods.

It should also be noted that the herein described systems and methods can be implemented in a variety of electronic environments (including both non-wireless and wireless computer environments, including cell phones and video phones), partial computing environments, and real world environments. The various techniques described herein may be implemented in hardware or software, or a combination of both. Preferably, the techniques are implemented in computing environments maintaining programmable computers that include a computer network, processor, servers, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

We claim:

1. Monitoring and analysis apparatus for use in a production plant, the apparatus comprising a computing processor operable to:
   receive operational data from one or more sensors operative to sense and communicate data representative of the operation of at least two production unit components utilized in the production process over a selected time interval;
   process the received operational data to transform the received operational data from a time domain to generated frequency domain data having harmonics;
   process the frequency domain data to calculate a value of an amplitude of each of at least one peak of the harmonics of the frequency domain data;
   identify the value of the amplitude of the peak of a significant harmonic of the frequency domain data for each of the at least two production unit components;
   apply a data normalization mathematical function to the identified amplitude values to calculate abnormalities in the identified amplitude values among two selected production unit components of the at least two production unit components as compared to data representative of normal operation amplitude values to generate processed production unit component monitoring data for the two selected production unit components; and
   store the generated processed production unit component monitoring data.

2. The apparatus according to claim 1, further operable to define operational data limits representative of a desired operation range for the at least two production units and to process the generated processed production unit component monitoring data to determine if the data is within the defined operational data limits.

3. The apparatus according to claim 2, further operable to generate alarm data representative of instances when the generated processed production unit component monitoring data fall outside the defined operational limits.

4. The apparatus according to claim 3, further operable to communicate the generated alarm data to a cooperating production unit component control apparatus for use in providing automated control operations to the at least two production unit components.

5. The apparatus according to claim 1, wherein the transform utilized to generate the frequency domain data is selected from the group of a discrete Fourier transform, Laplace transform, and histogram.

6. The apparatus according to claim 1, wherein each of the at least two production unit components comprises a pressure swing adsorption bed.

7. The apparatus according to claim 1, wherein each of the one or more sensors is a pressure sensor and the data representative of the operation of at least two production unit components comprises pressure data.

8. The apparatus according to claim 1, wherein the peak of the significant harmonic has a frequency that is equal to the inverse of a duration of a single step of a production process performed by each of the at least two production unit components.

9. A production plant comprising a plurality of production units, one more sensors operative to sense and communicate data representative of the operation of said production units, and monitoring and analysis apparatus according to claim 1.

10. A production plant comprising a plurality of production units, one more sensors operative to sense and communicate data representative of the operation of said production units, and monitoring and analysis apparatus according to claim 4.

11. A method for monitoring and analyzing production plant operational data comprising:
receiving operational data from one or more sensors operative to sense and communicate data representative of the operation of at least two production unit components utilized in the production process over a selected time interval;
processing the received operational data to transform the received operational data from a time domain to generated frequency domain data having harmonics;
processing the frequency domain data to calculate a value of an amplitude of each of at least one peak of the harmonics of the frequency domain data;
identifying the value of the amplitude of the peak of a significant harmonic of the frequency domain data for each of the at least two production unit components;
applying a data normalization mathematical function to the identified amplitude values to calculate abnormalities in the identified amplitude values among two selected production unit components of the at least two production unit components as compared to data representative of normal operation amplitude values to generate processed production unit component monitoring data for the two selected production unit components; and
storing the generated processed production unit component monitoring data.

12. The method according to claim 11, further comprising calculating the log of the ratio of the identified amplitude values, the log of the amplitude ratio data representative of the log of the ratio of the identified amplitude values among the two selected production unit components of the at least two production unit components to generate the processed production unit component monitoring data for the two selected production unit components.

13. The method according to claim 11, further comprising defining operational data limits representative of a desired operation range for the at least two production units and processing the generated processed production unit component monitoring data to determine if the data is within the defined operational data limits.

14. The method according to claim 13, further comprising generating alarm data representative of instances when the generated processed production unit component monitoring data fall outside the defined operational limits.

15. The method according to claim 13, further comprising applying a selected statistical algorithm to the generated processed production unit component data to identify statistically significant instances when the generated processed production unit component data is outside of the operational data limits.

16. The method according to claim 13, wherein the operational data limits are calculated by processing historical received production unit component data.

17. The method according to claim 11, wherein the significant harmonic of the transformed frequency domain data comprises the harmonic that has a frequency and the inverse of the frequency of the last significant harmonic of the transformed frequency domain data is greater than the time required to complete a single step of a production process production cycle.

* * * * *